United States Patent [19]

Donnelly et al.

[11] Patent Number: 4,825,649
[45] Date of Patent: May 2, 1989

[54] SHUTOFF AND PRESSURE REGULATING VALVE

[75] Inventors: Brian G. Donnelly, Suffield, Conn.; Gerald J. Gorneault, Palm Harbor, Fla.; Charles F. Stearns, East Longmeadow, Mass.

[73] Assignee: United Technologies Corporation, Hartford, Conn.

[21] Appl. No.: 111,385

[22] Filed: Oct. 22, 1987

[51] Int. Cl.$^4$ .................................................. F02K 3/10
[52] U.S. Cl. .................................. 60/261; 137/503; 137/613; 251/63
[58] Field of Search .................. 60/261; 137/503, 508, 137/613; 251/63

[56] References Cited

U.S. PATENT DOCUMENTS

| | | | |
|---|---|---|---|
| 2,970,609 | 2/1961 | Beremand | 251/63 |
| 3,620,249 | 11/1971 | Simmons | 137/503 |
| 3,999,813 | 12/1976 | Whitaker | 137/503 |
| 4,216,793 | 8/1980 | Volgstadt et al. | 251/63 |
| 4,229,939 | 10/1980 | Smith | 60/261 |
| 4,586,536 | 5/1986 | Karmel | 137/503 |
| 4,612,766 | 9/1986 | Eder | 60/261 |
| 4,620,560 | 11/1986 | Coutant | 137/118 |

Primary Examiner—Donald E. Stout
Attorney, Agent, or Firm—Lloyd D. Doigan

[57] ABSTRACT

Fuel is directed to the stages of an afterburner by metering flow to the stages with a single metering valve and by controlling the flow to each stage by means of an integral shutoff and regulating valve. Each shutoff valve opens and closes the fuel flow to a stage as required. Each regulating valve, which is housed within a respective shutoff valve, regulates flow to each segment as a function of the pressure drop across the metering valve so that a constant weight flow to the segment is achieved.

6 Claims, 3 Drawing Sheets

SHUTOFF AND PRESSURE REGULATING VALVE

DESCRIPTION

TECHNICAL FIELD

This invention relates to fuel controls and more particularly to a shutoff and regulating valve for use therein.

BACKGROUND ART

One method to augment the thrust of a turbojet or turbofan engine is to utilize an afterburner. Afterburners increase thrust by adding heat energy to an entering gas stream. Fuel is generally introduced to the gas stream by the afterburner in stages (segments) so that the heat energy can be increased gradually from zero to the desired value. By gradually increasing the heat energy, the afterburner provides increased control and the probability of engine blowout or surge is minimized.

Staging is regulated by a fuel control which inputs fuel to each successive stage in the afterburner so that the mixture ratio in each stage is nearly stoichiometric. Generally, the fuel control has a separate shutoff and pressure regulating valve for each stage. Because there may be sixteen stages, separate shutoff and regulating valves increase both the weight and the volume of a fuel control.

DISCLOSURE OF INVENTION

It is an object of the invention to reduce both the weight and volume of afterburner fuel controls.

According to the invention, fuel is directed to the stages of an afterburner by metering flow to the stages with a single metering valve and by controlling the flow to each stage by means of an integral shutoff and regulating valve. Each shutoff valve opens and closes the fuel flow to a stage as required. Each regulating valve, which is housed within a respective shutoff valve, regulates flow to each segment as a function of the pressure drop across the metering valve so that a constant weight flow to the segment is achieved.

As a result the weight, volume and complexity of the afterburner fuel control is achieved.

These and other objects, features and advantages of the present invention will become more apparent in light of the following detailed description of a best mode embodiment thereof, as illustrated in the accompanying drawing.

BEST MODE FOR CARRYOUT THE INVENTION

Figure 1:
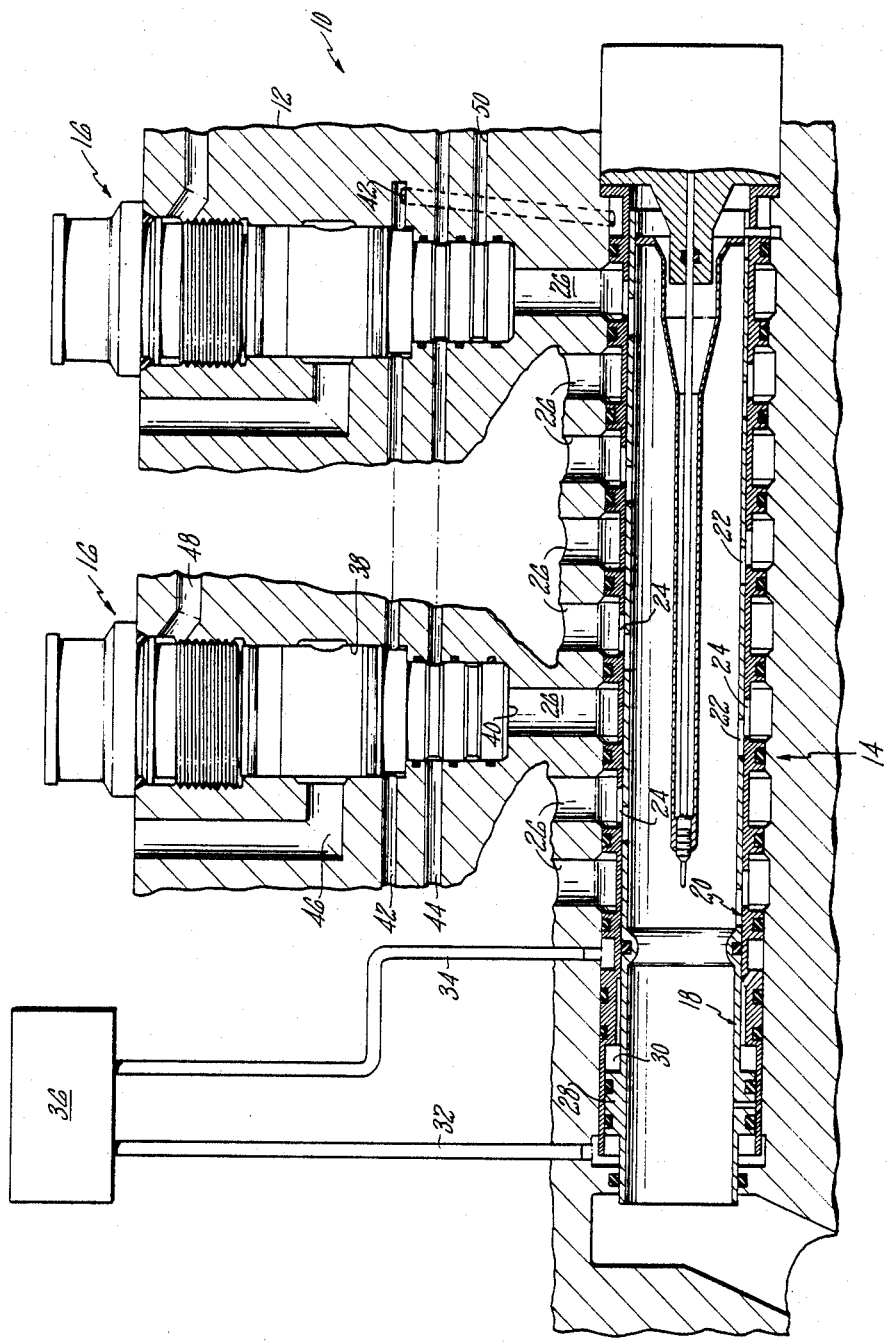
FIG. 1 is a schematic, partially cut away, view of a fuel control which incorporates an embodiment of the pressure regulating and shutoff valve of the invention.
Figure 2:
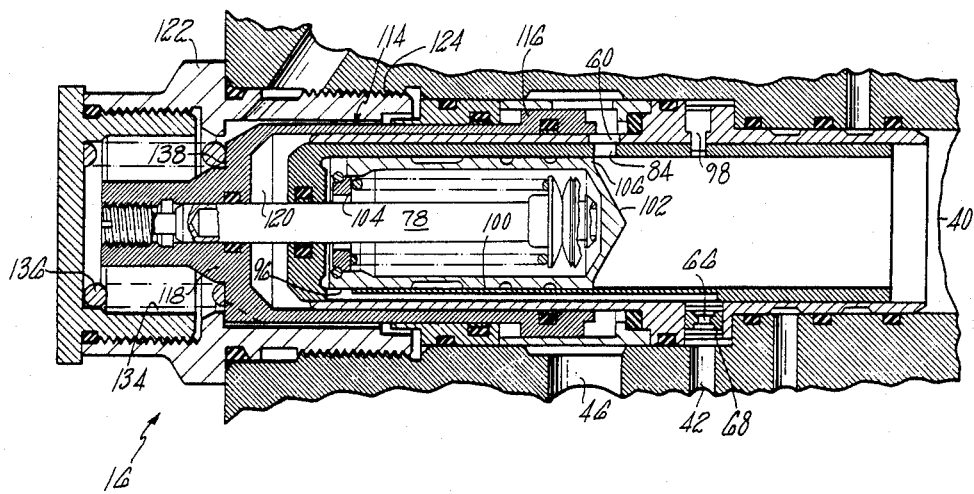
FIG. 2 is a cross sectional, partially cut away, view of the valve of FIG. 1 shown in the open position.
Figure 2A:
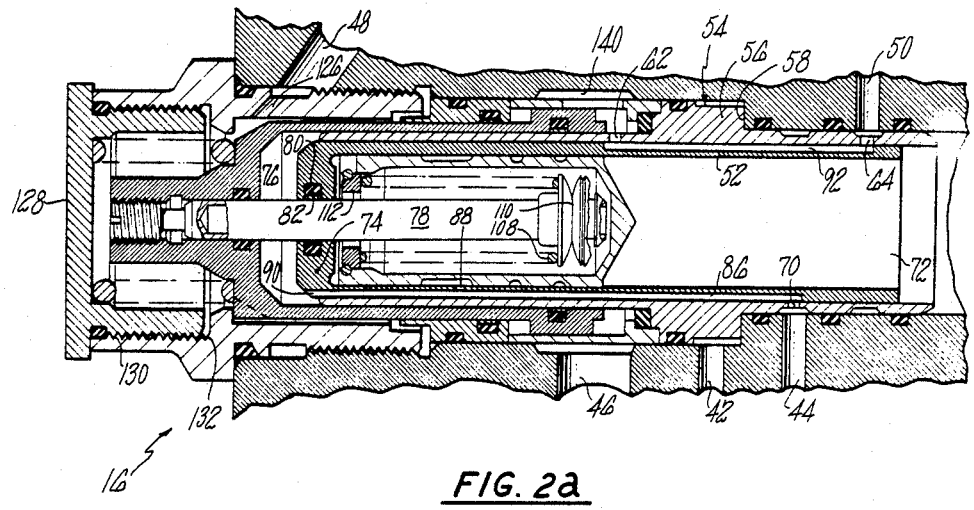
FIG. 2A is a cross sectional, partially cut away, view of the valve of FIG. 2 shown in the open position with the inner and outer sleeve being partially rotated from FIG. 2.
Figure 3:
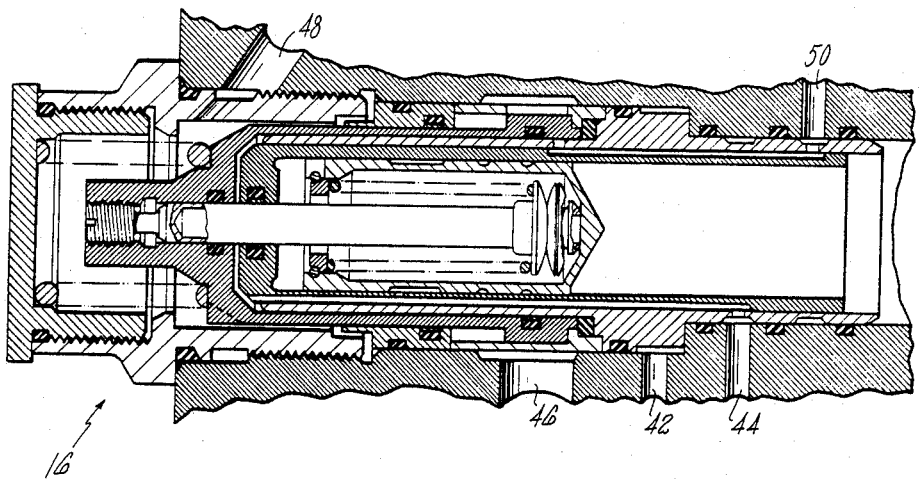
FIG. 3 is a cross sectional, partially cut away, view of the valve of FIG. 1 shown in the closed position.
Figure 3A:
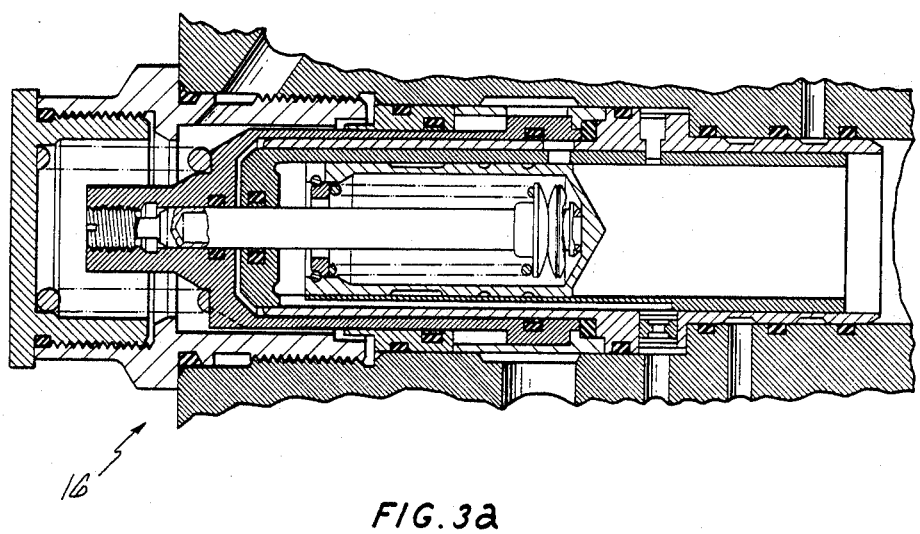
FIG. 3A is a cross sectional, partially cut away, view of the valve of FIG. 3 with the inner and outer sleeve being partially rotated from FIG. 3.

Referring to FIG. 1 a portion of a fuel control including an embodiment of the shutoff and pressure regulating valve of the invention is shown. The fuel control is designed generally to control the amount and sequence of fuel provided to the afterburning segments (not shown) of a turbofan or turbojet engine (not shown). The fuel control generally includes a housing 12, a metering valve 14, and a plurality of combined shutoff and pressure regulating valves 16 (SRVs two of which are shown). The metering valve regulates the amount of fuel flowing to the afterburner segments. The SRVs turn each segment on and off as well as regulate the pressure drop across the metering valve.

The metering valve has a roughly cylindrical spool 18 that is close fitted for lateral movement within a cylindrical sleeve 20 within the housing 12. The spool has a plurality of windows 22 which align with openings 24 within the sleeve. Each sleeve opening aligns with a metered line 26 which communicates with an SRV 16. A cylindrical flange 28 extends outwardly from the left-hand side of the spool within a portion of a chamber 30 within the sleeve. Hydraulic fluid is brought to bear upon the flange via line 32 or line 34. An electrohydrolic valve 36 (EHV) controls the amount of fluid admitted to line 32 or line 34 thereby subjecting the flange and therefore the spool to pressure unbalances which cause the spool to move laterally. Lateral movement of the spool effects the size of the cross-sectional area between each window 22 and each opening 24 thereby metering the flow via each metered line 26 to each afterburner segment.

As stated above a combined shutoff and regulating valve (SRV) is placed within the flow path of each metered line. Each SRV 16 is disposed within a roughly cylindrical area 38 within the housing 12. Each SRV has a plurality of input and output lines, an inner and outer sleeve, a pressure regulating valve, and a shutoff valve as will be discussed infra.

Inputs and Outputs

The SRV 16 receives weight flow from the metering valve 14 through an upstream portion 40 of the metered line 26. The SRV senses pressure upstream of the metering valve via line 42 which communicates with the fuel within spool 18. The SRV senses high pressure for shutoff and cooling via line 44. Fuel weight flow passes through the SRV to be delivered to the engine via a downstream portion 46 of the metered line 26. The line 48 provides an hydraulic signal from a sequencing valve (not shown). The line 50 sends an hydraulic signal to a pump (not shown) as will be discussed infra.

Inner and Outer Sleeve

Referring to FIGS. 2, 2A, 3 and 3A, each SRV has an inner sleeve 52 and an outer sleeve 54. The outer sleeve, which has a roughly cylindrical shape is fitted within the opening 38 in the housing 12. An extending shoulder 56 of the outer sleeve abuts a portion 58 of the housing to provide reliable placement.

The outer sleeve 54 has five orifices. A first orifice 60 communicates fuel to the downstream portion 46 of the metered line. A second orifice 62 (see FIG. 2A) communicates the pressure of the fuel within the downstream portion 46 of the metered line (as will be discussed infra). The third orifice 64 (see FIG. 2A) communicates the pressure of the fuel within the downstream portion 46 of the metered line to line 50 (as will be discussed infra). The fourth orifice 66 (see FIG. 2), which includes a filter element 68, communicates upstream pressure from line 42. The fifth orifice 70 (see FIG. 2A) communicates cooling flow and pressure from a source (not shown) via line 44.

The inner sleeve 52 has a roughly cylindrical shape with an open end portion 72 and a closed end portion 74. The closed end portion has a flange 76 extending radially inwardly that is adapted to receive a shaft 78 (as will be discussed infra). The flange has a circular slot 80 having an O-ring 82 disposed therein so that the shaft is held in sealing relationship to the flange.

The inner sleeve 52 has a first, second and third channels machined within its outer surface and four apertures. The first aperture 84 communicates with the first orifice 60 to allow metered flow to pass from the upstream 40 to the downstream portion 46 of the metered line. The first channel 86 communicates with the fifth orifice 70 to communicate cooling flow and pressure to the second and third apertures 88, 90. The second channel 92 provides a conduit between the second and third orifices 62, 64 to communicate the pressure of the fuel within the downstream portion 46 of the metered line to line 50. The third channel 94 communicates with the fourth orifice 66 to communicate upstream pressure to the interior of the inner sleeve via the fourth aperture 96.

The outer sleeve 54 is fixedly attached to the inner sleeve 52 for cooperation therewith by a pin 98.

PRV

A pressure regulating valve (PRV) 100 is mounted for reciprocal motion within the inner sleeve 52. The PRV has a closed conical end portion 102 and an open end portion 104. The conical end portion tapers outwardly to the left and fairs into a shoulder 106 which is designed to regulate flow through the first aperture 84 of the inner sleeve. The shaft 78 is disposed within the PRV. The shaft is attached to the PRV by a spring 108 and two bimetallic heat compensating elements 110 which are arranged circumferentially about the shaft. The spring attaches at its right end to the bimetallic elements and at its left end to a flange 112 extending inwardly from the open end portion 104 of the PRV 100.

SOV

The SOV 114 has an open end portion 116 surrounding the outer sleeve 54 and a closed end portion 118 in which the shaft 78 is secured. The shaft is screwably mounted within the SOV so that calibrations of the PRV can be easily made therefrom.

A chamber 120 is formed between the closed end portion 118 of the SOV 114 and the closed end portion 74 of the inner sleeve 52 as will be discussed infra. A cylindrical insert 122, which is adapted to be screwed into the housing 12 via threaded portions 124, has an opening 126 communicating with line 48. A cap 128 has a threaded cylindrical portion 130 that is adapted to be screwed into an interior threaded portion 132 of the insert. A cavity 134 is formed within the cap 128 and the end portion 118 of the SOV. A spring 136 provides a bias on the closed end portion of the SOV attaching its right end to a shoulder 138 of the SOV and at its left end to the cap 128.

Operation

In operation, high pressure is brought to bear through the fifth orifice 70 in the outer sleeve 54 and the first channel 86 and third aperture 90 in the inner sleeve 52 to the chamber 120. The high pressure in the chamber overcomes the spring force of spring 136 to move the SOV 11 to the left (see FIGS. 2 and 2A) so that the fuel may flow through the first orifice 60 and aperture 84 through a circumferential channel 140 in the housing to the downstream portion 46 of the metered line to the engine. As the fuel is delivered to the engine, pressure downstream of the metering valve 14 is sensed by the PRV 100 on its conical section 102 via the upstream portion 40 of the metered line 26. Pressure upstream of the metering valve is sensed by the PRV via the fourth orifice 66 from line 42, the third channel 94 and fourth aperture 96 in the inner sleeve 52. The PRV reacts to the differentials between the upstream and downstream pressure (as influenced by the spring force of spring 108 and the temperature compensating disks 110) to regulate the pressure drop across the metering valve. The shoulder 106 of the PRV is positioned by the movement thereof caused by the differentials to regulate the area of the first aperture thereby regulating the pressure drop. The temperature compensating disks 110 (which are formed of bimetallic elements as are well known in the art) are designed to offset the effect of temperature changes on the spring 108 so that pressure regulation is relatively accurate as temperature changes.

In the SOV that is opened first by the sequencing valve (by porting pressure from the cavity 134), the pressure of the fuel flowing in the downstream portion 46 of the metered line is directed via the second orifice 62 of the outer sleeve 54, the second channel 92 in the inner sleeve 52, and the third orifice 64 in the outer sleeve and to the line 50. The line 50 communicates the pressure of the fuel to a valve (not shown) which regulates pump (not shown) pressure to accommodate metered flow through the SRVs to the engine.

To shut off the valve, high pressure is directed through line 48 by the segment sequencing valve to the cavity 134. The combined force of the high pressure and the spring 136 act to move the SOV to the right thereby shutting off flow through the first orifice 64 and aperture 80 (see FIGS. 3 and 3A). Moreover, the SOV shuts off flow through the second orifice 62, the second channel 92 and the third orifice 64 of the outer sleeve to further regulate pump pressure.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for controlling the flow of fuel to a plurality of stages in an afterburner characterized by:
    a metering valve for simultaneously metering the flow of fuel to each of said plurality of stages,
    a plurality of valves, each of said valves controlling said metered flow to a particular stage, each of said valves having:
    a first valve element for communicating with said metered flow, said first element being selectively positionable such that said first element may selectively shut off or open said fuel flow through said valve to said particular stage; and a second valve element disposed within said first valve element, said second valve element responding to differentials in pressure upstream and downstream of said metering valve to control the pressure drop across said metering valve by regulating said fuel flow from said valve as a function of said differentials.

2. The apparatus of claim 1, wherein said second valve element is disposed coaxially within said first valve element.

3. The apparatus of claim 1, wherein said first valve element is characterized as having an open end portion, said open end portion receiving said fuel flow and selectively shutting off or opening said fuel flow through said valve, and a closed end portion, said closed end portion being responsive to an hydraulic signal for positioning said first valve element.

4. The apparatus of claim 3, wherein said second valve element has a closed end portion for sensing said pressure downstream of said metering valve and for regulating said fuel flow, and an open end portion for sensing said pressure upstream of said metering valve.

5. The apparatus of claim 4, further characterized by means for communicating said upstream pressure to said second element.

6. The apparatus of claim 1, further characterized by means for communicating said upstream pressure to said second element.

* * * * *